Dec. 13, 1955
M. PALUSKA
2,726,504
RAKE STRUCTURE
Filed May 7, 1953
2 Sheets-Sheet 1
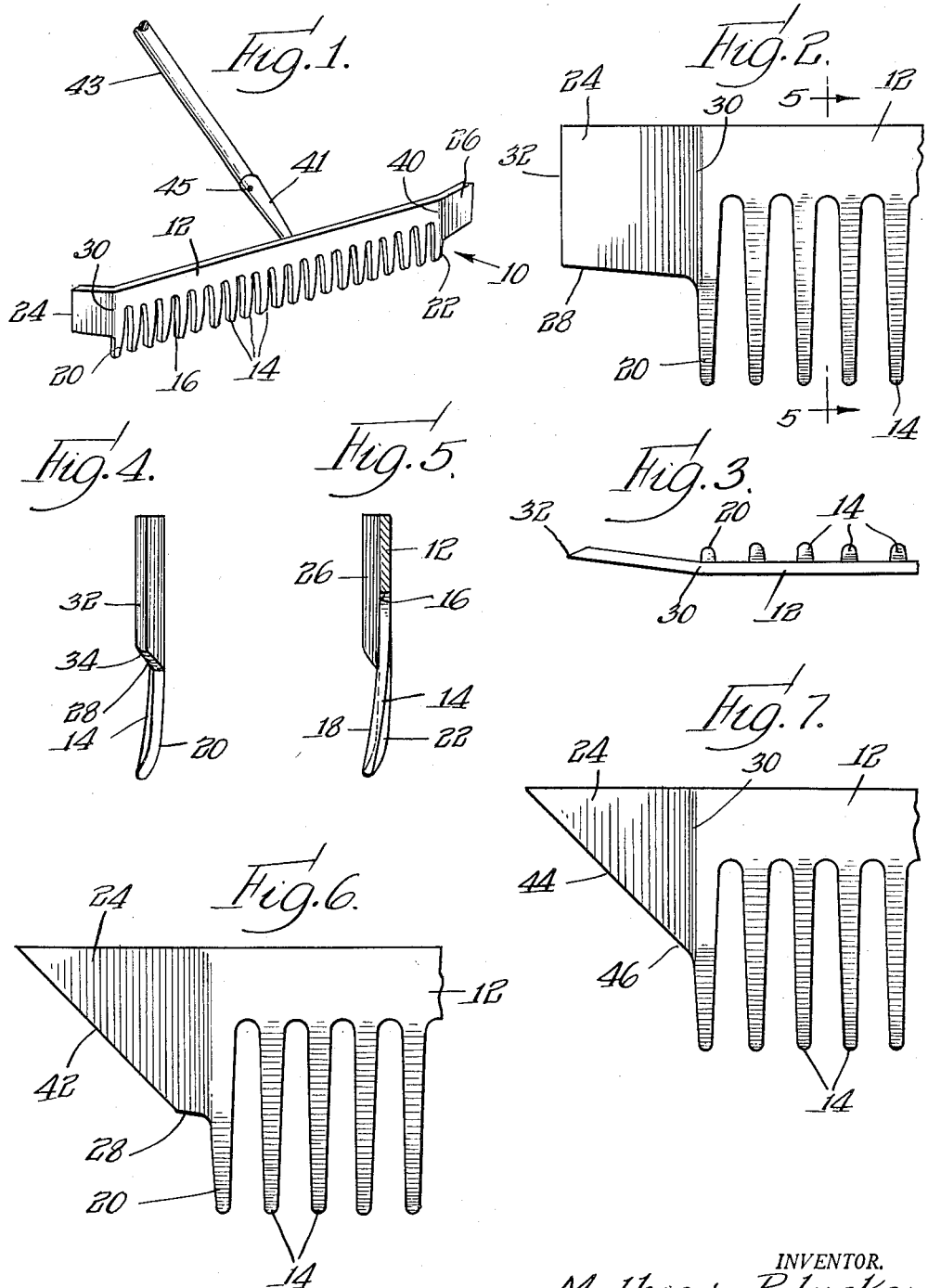
INVENTOR.
Mathias Paluska
BY
Moore, Olson & Trexler
attys.

Dec. 13, 1955 M. PALUSKA 2,726,504
RAKE STRUCTURE
Filed May 7, 1953 2 Sheets-Sheet 2
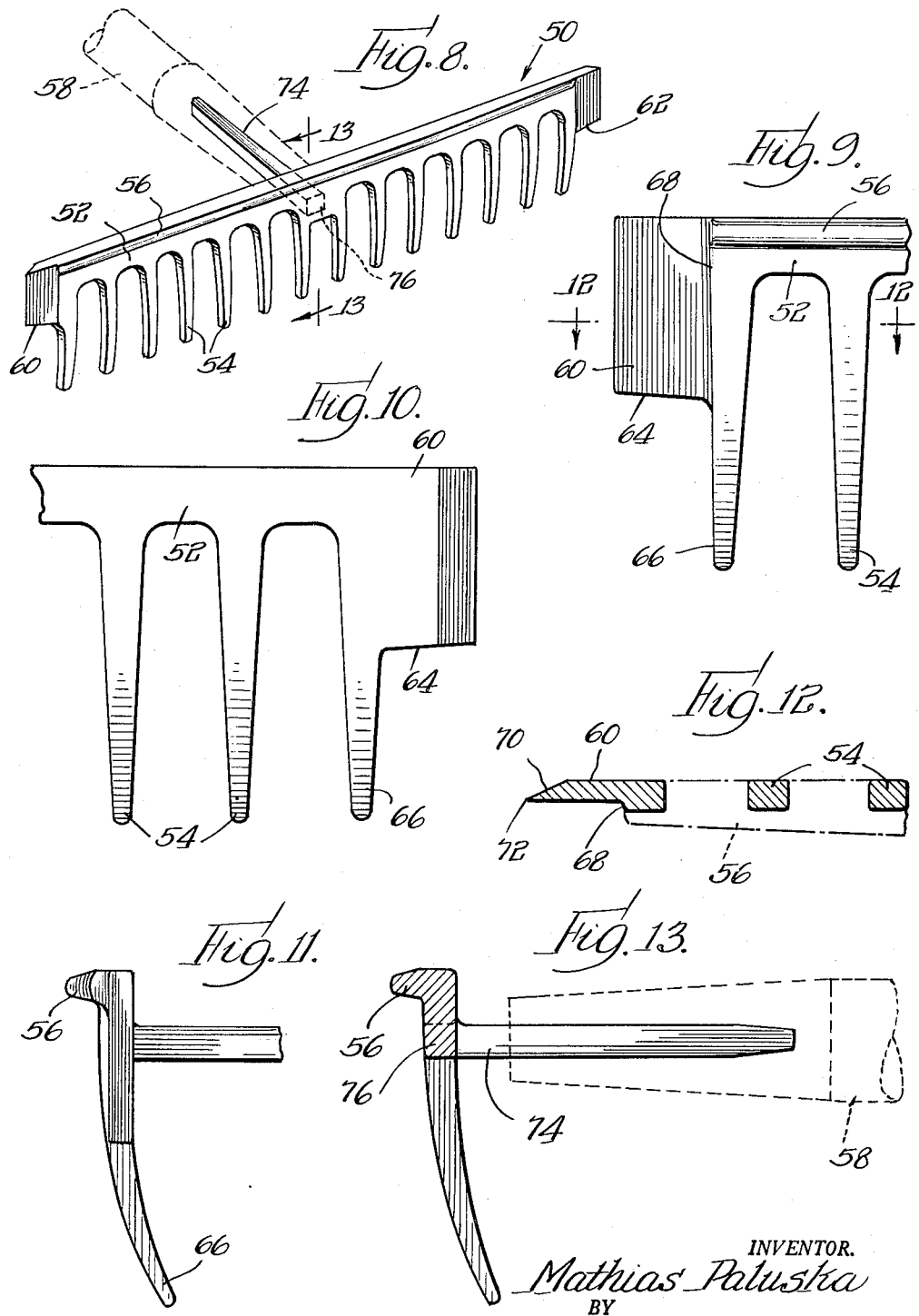
INVENTOR.
Mathias Paluska
BY
Moore, Olson & Trexler
attys.

United States Patent Office 2,726,504
Patented Dec. 13, 1955

2,726,504

RAKE STRUCTURE

Mathias Paluska, East Peoria, Ill.

Application May 7, 1953, Serial No. 353,509

5 Claims. (Cl. 56—400.05)

The present invention relates to an improved garden implement, and more particularly to an improved combined rake and hoe.

The present invention contemplates the provision of an implement, comprising a novel rake structure having blade-like members extending from the ends thereof, which blades serve to limit the distance the tines of the rake may dig into the ground and thereby prevent snagging of the rake and which blade may also be used to dig weeds or the like from a lawn or to cultivate between the plants in a garden.

Another object of this invention is to provide a novel implement of the above described type which may be cast from suitable material, such as malleable iron, in such a manner to provide improved strength characteristics and resistance to breaking and also to provide a balanced implement which may be readily handled by an operator.

Another object of this invention is to provide an implement of the above described type, wherein the blade-like members are constructed and arranged so that their edges, which engage the ground while the implement is being used as a rake, will slide over the ground relatively easily and will tend to retain grass or like material being gathered within the confines of the rake.

Other objects and advantages of the present invention will be apparent from the following description and the accompanying drawings, wherein:

Fig. 1 is a perspective view, showing an implement embodying the principles of this invention;

Fig. 2 is a fragmentary enlarged front elevational view of the device shown in Fig. 1;

Fig. 3 is an enlarged fragmentary plan view of the device shown in Fig. 1;

Fig. 4 is an enlarged end view of the device shown in Fig. 1;

Fig. 5 is a cross sectional view taken along line 5—5 in Fig. 2;

Fig. 6 is an enlarged fragmentary front elevational view of a modified embodiment of this invention;

Fig. 7 is an enlarged fragmentary front elevational view of still another modified form of the present invention;

Fig. 8 is a perspective view, showing the preferred form of an implement embodying the principles of this invention;

Fig. 9 is an enlarged fragmentary elevational front view of the implement shown in Fig. 8;

Fig. 10 is an enlarged fragmentary rear elevational view showing the implement of Fig. 8;

Fig. 11 is an enlarged end elevational view showing the implement of Fig. 8;

Fig. 12 is a horizontal cross section taken along line 12—12 in Fig. 9; and

Fig. 13 is an enlarged vertical cross section taken along line 13—13 in Fig. 8.

Referring now more specifically to the drawings, wherein like parts are designated by the same numeral throughout the various figures, an implement head 10, embodying the features of this invention, is shown in Figs. 1 through 4. The head 10 is preferably constructed of an integral malleable iron casting.

The head 10 includes an elongated body section 12 having a plurality of teeth or tines 14 extending from spaced points along the lower longitudinal edge 16 of the body section. The teeth or tines 14 are preferably, but not necessarily, curved rearwardly from their roots or junctions with the body section to their free ends (see Fig. 5) so that their rear surfaces 18 are curved and inclined upwardly, whereby the grass, leaves, or like material being gathered by the rake is directed upwardly from the ground. The tines are spaced so that the outer tines 20 and 22 extend from opposite ends of the lower edge 16 of the body section 12.

The head 10 is provided with a pair of blade-like portions 24 and 26 which extend outwardly from opposite ends of the body section 12. The lower edge 28 of the blade 24 is positioned so that it merges with the end tine 20 at a point between the root and the outer free end of the tine. Preferably, the edge 28 merges with substantially the mid portion of the tine. As shown best in Fig. 2, the edge 28 extends generally normally to the longitudinal axis of the tine 20 and is preferably inclined slightly upwardly toward its outer end. Thus, the edge 28 provides a stop surface which limits the distance which the tines can dig into the ground and thus tends to prevent snagging of the implement while it is being used as a rake. Furthermore, the upward inclination of the edge 28 positions the outer free end thereof above the ground to permit the edge to be drawn over the ground without undue resistance or snagging. If desired, however, by applying pressure to the implement, the edge 28 may be forced to dig into the ground to provide a smooth path at the side of the furrows formed by the tines of the head 10. This is especially useful in laying out the rows of a garden where it is desired to space various varieties of plants from each other by a separating path.

It should be noted that the blade 24 is substantially flat so that the blade will normally tend to slide over the ground rather than dig into the ground. In order to simplify the manufacture of the blade 24 and the end tine 20 with which the blade merges, the upper or inner portion of the tine 20 is also made substantially flat while the lower or outer portion of the tine 20 beyond the edge 28 is curved rearwardly to bring the free end of the tine into alignment with the free ends of the tines 14.

It should be noted also that the blade 24 is bent along the line 30 which forms the junction of the blade with the body section 12. This structure causes the blade to be inclined rearwardly from the plane of the body section, as shown best in Fig. 3. When the implement is being used to rake grass, leaves, or the like, the rearwardly inclined blade directs the accumulated material toward the center of the head 10 and thus tends to maintain the material within the confines of the head. The inclination of the blade also presents the blade at a more efficient angle to the ground when the implement is being used as a hoe or to dig weeds and the like. Furthermore, the blade 24 provides, in effect, a flange at the end of the body section 12, which flange serves to rigidify the body section, thus enabling a lighter weight material to be used. The corners of the edge 28 of the blade 24 preferably are rounded slightly, as at 34, to reduce further any tendency for the edge 28 to dig into the ground when the implement is being used as a rake.

The blade 24 is provided at its outer end with a sharp cutting edge 32 which enables the implement to be used as a hoe when it is turned so that the cutting edge engages the ground. In the embodiment shown in Figs. 1 through 5, the edge 32 extends substantially parallel to the axis of the end tine 20 so that a relatively broad cutting tool is provided. It should be noted that the tine 20 acts as a stop to limit the depth to which the blade 24 may dig into the ground. The length of the blade is, however, sufficient to permit a relatively deep cut of one to two inches or more to sever the roots of various weeds well below the surface of the ground. The blade 26 and the end tine 22 are preferably constructed in substantially the same manner as the blade 24 and the end tine 20 described above. Thus, the blade 26 is provided with a lower, slightly upwardly inclined, edge 36 which merges with the mid portion of the tine 22, with an outer cutting edge 38, and the blade 26 is bent rearwardly along the junction line 40.

The head 10 is provided with a handle receiving socket 41 which comprises a tapered metal tube within which the tapered end of the handle 43 is inserted. The socket 41 may be formed integral with the head 10, or the socket may be formed as a separate part and secured to the head by welding, riveting or in any other suitable manner. The end of the handle, which is preferably formed of wood, is secured within the socket by a rivet 45 extending through aligned apertures in the socket and handle.

The embodiment of the invention shown in Fig. 6 is constructed in substantially the same manner as the embodiment shown in Figs. 1 through 5 and described above. However, in this construction, the end cutting edge 42 of the blade is inclined upwardly at an angle to the axis of the tines 20. This form makes the blade especially useful as a small plow for narrow spaces in gardens and also for digging relatively deep for cutting the roots of weeds. Furthermore, the inclination of the cutting edge 42 makes it easier to cut weeds since the edge will slide across the weed to provide a sawing action as the tool is inserted into the ground.

The embodiment shown in Fig. 7 is substantially identical to the embodiment of Fig. 6, except that the lower edge 28 of the blade has been eliminated and the inclined end of the blade merges directly with the tine 20. In this embodiment, it is preferred that only the upper or outer portion 44 of the inclined edge be sharpened to provide a cutting edge while the lower or inner portion 46 is preferably substantially flat with slightly rounded corners to provide a stop surface which functions in a manner similar to the edge 28 described above.

In Figs. 8 through 13, an implement 50 is illustrated which embodies the preferred form of this invention. The implement 50 is preferably cast as an integral member from any suitable material, such as malleable iron. The implement 50 includes a body portion 52 having a plurality of tines 54 extending from the lower edge thereof, which tines may be substantially identical to the above described tines 14. A rigidifying and balancing rib or bead 56 is formed along the upper edge of the body 52 and extends forwardly thereof, as shown best in Figs. 8, 11, and 13, and in dotted lines in Fig. 12. It should be noted that the rib 56 is heavier and wider adjacent the mid portion of the implement body member and tapers inwardly toward the ends of the body member. By this structure, the implement body member is given sufficient strength and rigidity to withstand normal use, and at the same time, the implement is balanced with respect to the handle 58, whereby the implement may be turned to utilize the blades 60 and 62 for the purposes fully set forth above in the description relating to the blades 24 and 26.

The blades 60 and 62 are formed in substantially the same manner as the above described blades 24 and 26. Thus, as shown best in Figs. 9 and 10, the blade 60 includes a lower upwardly inclined edge 64 which merges with the end tine 66 and substantially the mid portion thereof. However, in this embodiment, the blade 60 is substantially co-planar with the implement body portion, as shown best in Fig. 12, with the exception that the blade is somewhat thinner than the body portion, whereby a shoulder 68 is provided at the junction between the blade and the implement body portion. The relative thinness of the blade 60 makes the blade more readily adaptable for use as a hoe or the like, and the shoulder 68 provides a stop surface along with the end tine 66 for limiting the distance which the blade 60 may dig into the ground. It will be noted that the shoulder 68 extends completely across the blade, whereby the tendency for the implement to twist or tilt is reduced. It will be noted that the rear surface of the blade 60 is bevelled, as at 70, to provide a relatively sharp cutting edge 72. By providing this bevelled surface 70 at the back of the blade, rather than the front, the blade is directed into the ground, rather than along the surface of the ground, as would be the case where the bevelled surface is provided at the front of the blade. It is, of course, understood that the blade 62 is constructed in the same manner as the blade 60, and, therefore, need not be described in detail.

The implement 50 is secured to the usual handle 58 by means of a shank 74. This shank 74 is preferably cast integrally with the body portion 52. As shown best in Figs. 8 and 13, an integral web 76 extends downwardly between a pair of the tines 54, and the shank 74 extends from this web. By this structure, the connection between the shank and the body portion of the implement is given sufficient strength and rigidity.

While the preferred embodiments of the present invention have been shown and described herein, various changes may be made in the details of the structure without departing from the spirit and scope of the appended claims. For example, instead of providing identical blade structures at the opposite ends of the body section 12, one of the blades could be in the form shown in Figs. 1 through 5, and the other blade could be in the form shown in either Figs. 6, 7, or 8.

I claim:

1. A one piece implement of the class described comprising an elongated generally flattened body section, an integral rigidifying rib extending from one side of said body section along one longitudinal edge thereof, a plurality of integral tines extending outwardly and curved rearwardly from points spaced along the opposite longitudinal edge of the body section, and integral shank extending rearwardly from said body section for connection with a handle, said shank being substantially centrally disposed between opposite ends of said body section, and a pair of blade-like members integral with and extending outwardly from opposite ends of said body section, each of said blade-like members having a bottom edge merging with a mid-portion of an endmost tine at its respective end of the body section, said blade-like members and portions of the endmost tines above said bottom edges being generally flat and portions of the endmost tines below said bottom edges being curved rearwardly, and at least one of said blade-like members having a relatively sharp edge extending transversely of the longitudinal axis of the body section.

2. A one piece implement as defined in claim 1 which includes shoulder means at the junction between said last mentioned blade-like member and said body section to limit any movement of said last mentioned blade-like member into the ground, said shoulder means extending substantially entirely across said blade-like member and being in substantial alignment with the endmost tine associated with said last mentioned blade-like member to restrain twisting of the implement when said last mentioned blade-like member is in use.

3. A one piece implement as defined in claim 1 wherein said last mentioned blade-like member includes a rearwardly facing surface, which surface is bevelled to provide said relatively sharp edge.

4. A cast metal one piece implement of the class described comprising an elongated generally flattened body section, an integral rigidifying rib extending from one side of said body section along one longitudinal edge thereof, a plurality of integral tines extending outwardly and curved rearwardly from points spaced along the opposite longitudinal edge of said body section, said tines having a length substantially greater than the height of said body section, a web portion depending from said opposite longitudinal edge and disposed between a pair of generally centrally located tines, said web portion being integral with said last mentioned longitudinal edge and tines, an integral shank extending rearwardly from said web portion for connection with a handle, and a pair of blade-like members integral with and extending outwardly from opposite ends of said body section, each of said blade-like members having a bottom edge merging with a mid-portion of an endmost tine disposed adjacent its respective end of the body section, and at least one of said blade-like members having a relatively sharp edge extending generally transversely of the longitudinal axis of said body section.

5. A cast metal one piece implement as defined in claim 4 wherein said rigidifying rib is relatively thick adjacent the middle of said body section and tapers inwardly toward the ends of said body section.

References Cited in the file of this patent

UNITED STATES PATENTS

| | | |
|---|---|---|
| 1,537,005 | Carson | May 5, 1925 |
| 2,080,763 | Cox | May 18, 1937 |
| 2,109,488 | Wegner | Mar. 1, 1938 |